US012457507B2

(12) United States Patent
Rajaee et al.

(10) Patent No.: US 12,457,507 B2
(45) Date of Patent: Oct. 28, 2025

(54) PI CONTROLLER FOR CELLULAR BASEBAND MITIGATION

(71) Applicant: Apple Inc., Cupertino, CA (US)

(72) Inventors: Amir Rajaee, San Carlos, CA (US); Hao Ping Wen, Sunnyvale, CA (US); De Jun Li, Santa Clara, CA (US); Murali Mohan Chakka, Los Gatos, CA (US); Douglas A MacKay, San Mateo, CA (US); Vasanthakumar Balasubramaniam, San Jose, CA (US); Achmed Rumi Zahir, Menlo Park, CA (US); Prashant H Vashi, San Jose, CA (US); Mingkun Li, San Jose, CA (US); Priyank Mamania, Milpitas, CA (US); Michael V Yeh, Cupertino, CA (US); Luca Aldegheri, Mountain View, CA (US); Reza Arastoo, Santa Clara, CA (US); Tu Le, Los Gatos, CA (US); Punit H Awatramani, Fremont, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 18/301,189

(22) Filed: Apr. 14, 2023

(65) Prior Publication Data

US 2024/0349080 A1 Oct. 17, 2024

(51) Int. Cl.
*H04W 52/02* (2009.01)
*H04W 24/02* (2009.01)
*H04W 88/18* (2009.01)

(52) U.S. Cl.
CPC ....... *H04W 24/02* (2013.01); *H04W 52/0203* (2013.01); *H04W 88/18* (2013.01)

(58) Field of Classification Search
CPC .............................. H04W 24/02; H04W 52/02
See application file for complete search history.

(56) References Cited

U.S. PATENT DOCUMENTS 11,259,251 B2 2/2022 Maggi et al.
2017/0099204 A1 4/2017 Park et al.
(Continued)

FOREIGN PATENT DOCUMENTS

WO 2019067136 A1 4/2019
WO 2021087042 A1 5/2021

OTHER PUBLICATIONS

Extended European Search Report for European Patent Application No. 24169891.9 dated Sep. 3, 2024; 8 pgs.

*Primary Examiner* — Michael T Vu
(74) *Attorney, Agent, or Firm* — FLETCHER YODER PC

(57) ABSTRACT

Communication device may include a transmitter and a receiver respectively coupled to one or more antennas to communicate (e.g., transmit or receive signals) with a base station. The communication device may receive an operating characteristic of a cellular modem within the communication device operating in a first cellular configuration and determine if the operating characteristic are greater than a threshold. The operating characteristic may include power and/or temperature. The threshold may include a power budget and/or a temperature threshold. If the operating characteristic is greater than the threshold, then the communication device may determine a control effort value based on the operating characteristic and the threshold. The communication device may map the control effort value to a second cellular configuration, which may correspond to reduced operating characteristics in comparison to the first cellular configuration. The communication device may then cause the cellular modem to operate in the second cellular configuration.

20 Claims, 7 Drawing Sheets

(56) References Cited

U.S. PATENT DOCUMENTS

| | | | | |
|---|---|---|---|---|
| 2019/0075524 | A1* | 3/2019 | Zhou .................. | H04W 52/228 |
| 2022/0256480 | A1 | 8/2022 | Feuersaenger et al. | |
| 2022/0269330 | A1* | 8/2022 | Abou-Alfotouh .... | G06F 1/3234 |
| 2025/0063516 | A1* | 2/2025 | Elshafie ................ | H04W 52/10 |

* cited by examiner

124

| LTE CCs # (190A) | LTE 4Rx CCs # (190B) | NR FR2 CCs # (190C) | NR FR2 PANEL ELEMENTS # (190D) | CE (136) |
|---|---|---|---|---|
| 4 | 4 | 8 | 5 | 0.00 (192A) |
| | | ... | | |
| 1 | 0 | 8 | 5 | 0.2 (192B) |
| | | ... | | |
| 1 | 0 | 8 | 1 | 0.3 |
| | | ... | | |
| 4 | 4 | 4 | 5 | 0.5 |
| | | ... | | |
| 1 | 0 | 4 | 1 | 0.6 |
| | | ... | | |
| 4 | 4 | 1 | 5 | 0.75 |
| | | ... | | |
| 1 | 0 | 1 | 1 | 1.00 (192C) |

| ROW INDEX | LTE CCs # | LTE CCs # WITH 4RX | NR FR2 CCs # | NR FR2 MMW ANTENNA ELEMENTS # | UL THROTTLE % | CONTROL EFFORT |
|---|---|---|---|---|---|---|
| 0 | 4 | 4 | 8 | 4 | 0 | 0 |
| 1 | 3 | 2 | 8 | 4 | 0 | 0.017 |
| 2 | 2 | 2 | 8 | 4 | 0 | 0.035 |
| 3 | 2 | 1 | 8 | 4 | 0 | 0.047 |
| 4 | 1 | 1 | 8 | 4 | 0 | 0.074 |
| 5 | 1 | 0 | 8 | 4 | 0 | 0.091 |
| 6 | 1 | 0 | 8 | 2 | 0 | 0.102 |
| 7 | 1 | 0 | 8 | 1 | 0 | 0.116 |
| 8 | 6 | 4 | 4 | 4 | 0 | 0.297 |
| 9 | 5 | 5 | 4 | 4 | 0 | 0.319 |
| 10 | 5 | 4 | 4 | 4 | 0 | 0.328 |
| 11 | 4 | 4 | 4 | 4 | 0 | 0.364 |
| 12 | 4 | 3 | 4 | 4 | 0 | 0.373 |
| 13 | 3 | 3 | 4 | 4 | 0 | 0.396 |
| 14 | 3 | 2 | 4 | 4 | 0 | 0.407 |
| 15 | 2 | 2 | 4 | 4 | 0 | 0.434 |
| 16 | 2 | 1 | 4 | 4 | 0 | 0.446 |
| 17 | 1 | 1 | 4 | 4 | 0 | 0.473 |
| 18 | 1 | 0 | 4 | 4 | 0 | 0.491 |
| 19 | 1 | 0 | 4 | 2 | 0 | 0.501 |
| 20 | 1 | 0 | 4 | 1 | 0 | 0.515 |
| 21 | 3 | 3 | 1 | 4 | 0 | 0.525 |
| 22 | 3 | 2 | 1 | 4 | 0 | 0.536 |
| 23 | 2 | 2 | 1 | 4 | 0 | 0.564 |
| 24 | 2 | 1 | 1 | 4 | 0 | 0.576 |
| 25 | 1 | 1 | 1 | 4 | 0 | 0.603 |
| 26 | 1 | 0 | 1 | 4 | 0 | 0.620 |
| 27 | 1 | 0 | 1 | 2 | 0 | 0.631 |
| 28 | 1 | 0 | 1 | 1 | 0 | 0.644 |
| 29 | 1 | 0 | 1 | 1 | 10 | 0.646 |
| 30 | 1 | 0 | 1 | 1 | 20 | 0.648 |
| 31 | 1 | 0 | 1 | 1 | 30 | 0.649 |
| 32 | 1 | 0 | 1 | 1 | 40 | 0.651 |
| 33 | 1 | 0 | 1 | 1 | 50 | 0.652 |
| 34 | 1 | 0 | 1 | 1 | 60 | 0.654 |
| 35 | 1 | 0 | 1 | 1 | 70 | 0.655 |
| 36 | 4 | 4 | 0 | 0 | 0 | 0.659 |
| 37 | 4 | 3 | 0 | 0 | 0 | 0.669 |
| 38 | 3 | 3 | 0 | 0 | 0 | 0.695 |
| 39 | 3 | 2 | 0 | 0 | 0 | 0.707 |
| 40 | 2 | 2 | 0 | 0 | 0 | 0.746 |
| 41 | 2 | 1 | 0 | 0 | 0 | 0.759 |
| 43 | 1 | 1 | 0 | 0 | 0 | 0.817 |
| 42 | 1 | 0 | 0 | 0 | 0 | 0.837 |
| 44 | 1 | 0 | 0 | 0 | 10 | 0.861 |
| 45 | 1 | 0 | 0 | 0 | 20 | 0.884 |
| 46 | 1 | 0 | 0 | 0 | 30 | 0.907 |
| 47 | 1 | 0 | 0 | 0 | 40 | 0.930 |
| 48 | 1 | 0 | 0 | 0 | 50 | 0.954 |
| 49 | 1 | 0 | 0 | 0 | 60 | 0.977 |
| 50 | 1 | 0 | 0 | 0 | 70 | 1 |

PI CONTROLLER FOR CELLULAR BASEBAND MITIGATION

BACKGROUND

The present disclosure relates generally to wireless communication, and more specifically to efficient power consumption or reducing thermal energy in a wireless communication device.

Implementation of $5^{th}$ Generation (5G) Near Radio (NR) has made certain components (e.g., cellular modems) heavy power consumers in battery operated devices, such as communication devices. For example, a cellular modem (e.g., transceiver) of a wireless communication device may operate at increased usage conditions (e.g., increased uplink or downlink conditions, increased throughput), which may consume significant power, reducing a state of charge of a battery of the device and negatively effecting a user experience. Moreover, the cellular modem may also generate heat (e.g., thermal energy) when operating at the increased usage conditions, which may decrease lifetime of certain components affected by the heat and/or decrease performance of the components.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a communication device may include a memory storing a relationship between a plurality of cellular configurations for a cellular modem and a plurality of control effort values, where each of the plurality of control effort values may be associated with a respective operating characteristic of the cellular modem, and processing circuitry coupled to the memory. The processing circuitry may receive an operating characteristic of the cellular modem operating in a first cellular configuration of the plurality of cellular configurations, receive a threshold from a power controller, and determine a control effort value based on the operating characteristic, the threshold, and a control function. The processing circuitry may also determine a second cellular configuration of the plurality of cellular configurations based on the control effort value and the relationship between the plurality of cellular configurations and the plurality of control effort values and transmit a first control signal indicative of the second cellular configuration to the cellular modem that causes the cellular modem to operate in the second cellular configuration.

In another embodiment, a non-transitory computer-readable medium, including instructions that, when executed by one or more processors, may cause the one or more processors to receive a power determination of a cellular modem operating in a first cellular configuration of a plurality of cellular configurations, receive a power budget from a power controller, and determine a control effort value based on the power determination, the power budget, and a proportional-integral (PI) controller. The instructions, when executed by the one or more processors, may also cause the processors to determine a second cellular configuration of the plurality of cellular configurations based on the control effort value and a relationship between the plurality of cellular configurations and a plurality of control effort values and transmit a control signal indicative of the second cellular configuration to the cellular modem that causes the cellular modem to operate in the second cellular configuration.

In yet another embodiment, a method may receive, at processing circuitry of a communication device, power consumption from a cellular modem operating in a first cellular configuration of a plurality of cellular configurations, determine a control effort value based on the power consumption, the power budget, and a control function, and determine a second cellular configuration of the plurality of cellular configurations based on the control effort value and a relationship between the plurality of cellular configurations and a plurality of control effort values. The method may then transmit a control signal indicative of the second cellular configuration to the cellular modem that causes the cellular modem to operate in the second cellular configuration.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 6 is an example table of the data structure of the mitigation logic of FIG. 4, according to embodiments of the present disclosure;

FIG. 7 is another example table of the data structure of the mitigation logic of FIG. 4, according to embodiments of the present disclosure;

DETAILED DESCRIPTION OF SPECIFIC EMBODIMENTS

Figure 1:
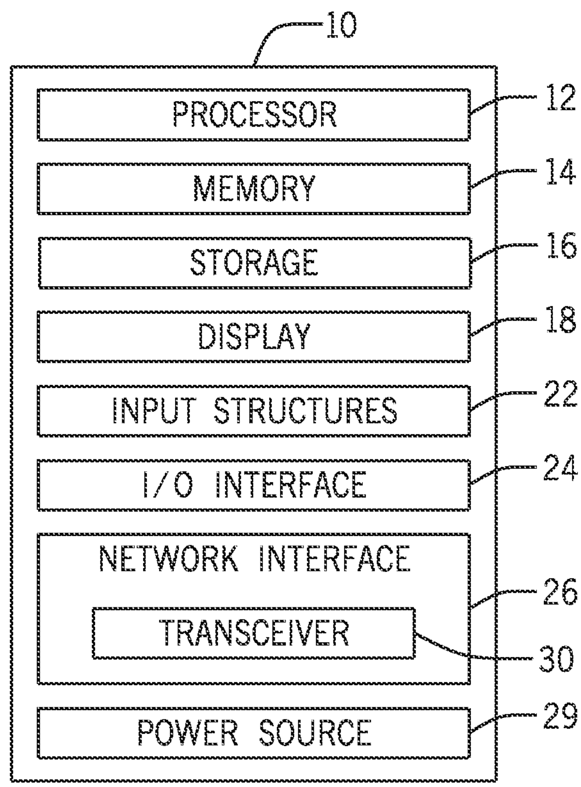
FIG. 1 is a block diagram of an electronic device, according to embodiments of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to reducing power consumption or heat generation by one or more components within an electronic device by reducing cellular functionality. The one or more components may include a cellular modem (e.g., transceiver), an antenna, a transmitter, a receiver, or the like. In certain instances, the communication device may receive an indication to operate in a cellular configuration with reduced power allocation and/or reduced thermal level (e.g., temperature value). The electronic device may receive a threshold value corresponding to a component or region of the electronic device. The threshold value may include a power budget allocated to a component of the electronic device or a threshold temperature that a component of the electronic device may generate and/or output during cellular operations.

For example, the electronic device may receive a power budget for a cellular modem from a power controller (e.g., processor). The power budget may include an amount of power allocated to the cellular modem for operations (e.g., transmitting and receiving wireless signals). The electronic device may also receive a power determination (e.g., a power value, such as a measured or estimated power consumption) from the cellular modem (e.g., a power determination module of the cellular modem) and determine if the power determination exceeds the power budget. The power determination may include power consumption of the cellular modem during the operations. If the power determination exceeds the power budget, then the electronic device may determine a cellular configuration to decrease the cellular modem's power consumption. For example, the electronic device may determine the cellular configuration based on the power budget and a static lookup table. The static lookup table may be generated based on peak throughput conditions (e.g., when the electronic device is operating at 100% throughput) and include a relationship between cellular configurations and respective power budgets. In this way, the cellular configuration may be determined based on a worst-case situation, which may aggressively reduce functionality of the cellular modem and decrease performance of the electronic device. For example, the electronic device may operate at 50% throughput, and be allocated a power budget of 4.9 watts (W). The electronic device may determine the cellular configuration associated with the power budget of 4.9 W based on the static lookup table and send an indication of the cellular configuration to the cellular modem to reduce power consumption. Since the power budgets are based on operating at 100% throughput, and the electronic device operates at 50% throughput, the electronic device may operate using cellular configurations associated with power budgets higher than 4.9 W without exceeding the allocated power budget. For example, the electronic device may use a cellular configuration associated with 5.2 W or 5.6 W when operating at 50% throughput (e.g., resulting in using 4.9 W or less) without exceeding the power budget, which may improve performance of the electronic device.

Embodiments herein provide various apparatuses and techniques to improve electronic device performance during operation in a configuration with reduced power consumption and/or reduced thermal energy generation. A processor of the electronic device may receive a budget (e.g., power budget, temperature threshold) for a cellular modem from a power controller and a determination (e.g., a power determination, temperature determination) from the cellular modem. The processor may determine a delta value by subtracting the determination from the budget and determine a control effort value based on the delta value and a controller. The controller may include a proportional-integral (PI) controller that receives the delta value and generates the control effort value. Using the control effort value, the processor may determine a cellular configuration based on a relationship between control effort values and respective cellular configurations.

For example, the electronic device may operate in a first cellular configuration of the cellular modem. The processor of the electronic device may receive the power budget for the cellular modem and power determination from the cellular modem. The processor may determine the delta value based on the power budget and the power determination and then determine the control effort value based on the delta value and the controller. Each control effort value may be associated with a cellular configuration that may also be associated with an amount of power consumed during operation. For example, a low control effort value may be associated with a cellular configuration that consumes more power than a cellular configuration associated with a high control effort value. The processor may determine a second cellular configuration based on the control effort value and the relationship and transmit a control signal with the second cellular configuration to the cellular modem to cause an adjustment in power consumption. In this way, the second cellular configuration may enable the electronic device to operate at a power budget.

In another example, the processor may receive a temperature threshold from a temperature controller and a temperature determination. The temperature threshold may include a maximum temperature set for a component within the electronic device and/or the cellular modem. The thermal temperature may include a temperature value for the component and/or the cellular modem. The processor may determine a delta value by subtracting the temperature determination from the temperature threshold. The processor then determine a control effort value based on the delta value and the controller and determine the cellular configuration based on the control effort value and the relationship. The processor may transmit an indication of the cellular configuration to the cellular modem for operation in the configuration, which may cause the temperature determination to change. In this way, the cellular configuration may enable the electronic device to operate at the temperature threshold.

FIG. 1 is a block diagram of an electronic device 10 (e.g., user equipment, wireless communication device), according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer, a portable electronic or handheld electronic device such as a wireless electronic device or smartphone, a tablet, a wearable electronic device, user equipment, and other similar devices. In additional or alternative embodiments, the electronic device 10 may include an access point, such as a base station, a router (e.g., a wireless or Wi-Fi router), a hub, a switch, and so on. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, Long Term Evolution® (LTE) cellular network, Long Term Evolution License Assisted Access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
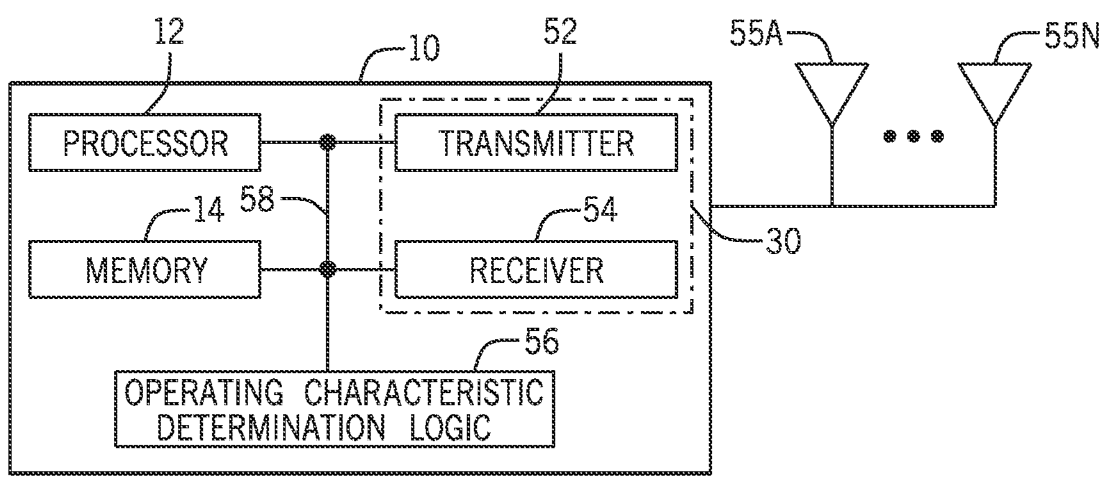
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

The electronic device 10 may also include operating characteristic determination logic 56 (e.g., power determination logic, temperature determination logic) to determine (e.g., estimate, measure) any suitable operating characteristic, such as power consumption (e.g., usage) and/or thermal energy (e.g., heat) generation. The operating characteristic determination logic 56 may include hardware (e.g., a power detector, a current sensor, a voltage sensor, a temperature sensor, a thermal sensor, a temperature transducer, a thermistor), software (e.g., logic, algorithm, module), firmware, or any combination thereof. For example, the operating characteristic determination logic 56 may measure or facilitate determining an amount of power being used by a component of the electronic device 10 (e.g., cellular modem, transceiver 30) via the processor 12. In another example, the operating characteristic determination logic 56 may provide a temperature determination (e.g., a temperature value, heat output) of a component within the electronic device 10 via the processor 12. The electronic device 10 may include one or more components that generate heat during operation and the operating characteristic determination logic 56 may be coupled to the components to measure the heat.

As illustrated, the various components of the electronic device 10 may be coupled together by a bus system 58. The bus system 58 may include a data bus, for example, as well as a power bus, a control signal bus, and a status signal bus, in addition to the data bus. The components of the electronic device 10 may be coupled together or accept or provide inputs to each other using some other mechanism.

Figure 3:
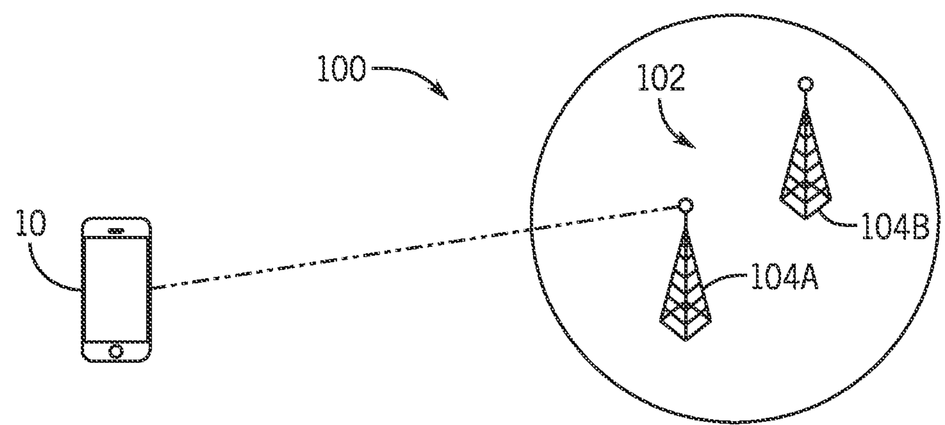
FIG. 3 is a schematic diagram of a communication system including the electronic device of FIG. 1 communicatively coupled to a wireless communication network supported by base stations, according to embodiments of the present disclosure.

FIG. 3 is a schematic diagram of a communication system 100 including the electronic device 10 of FIG. 1 communicatively coupled to a wireless communication network 102 supported by base stations 104A, 104B (collectively 104), according to embodiments of the present disclosure. The base stations 104 may include Next Generation NodeB (gNodeB or gNB) base stations and may provide 5G/NR coverage via the wireless communication network 102 to the electronic device 10. The base stations 104 may also include Evolved NodeB (eNodeB) base stations and may provide 4G/LTE coverage via the wireless communication network 102 to the electronic device 10. The base stations 104 may include any suitable electronic device, such as a communication hub or node, that facilitates, supports, and/or implements the network 102. The base station 104 may include at least some of the components of the electronic device 10 shown in FIGS. 1 and 2, including one or more processors 12, the memory 14, the storage 16, the transceiver 30, the transmitter 52, the receiver 54, and the associated circuitry shown in FIG. 3. Moreover, the network 102 may include any suitable number of base stations 104 (e.g., one or more base stations 104, four or more base stations 104, ten or more base stations 104, and so on).

The electronic device 10 may communicate with the base station 104 in any suitable number of cellular configurations with any suitable operating characteristic. For example, the electronic device 10, when operating in each of the cellular configurations, may use an amount of power and/or generate an amount of heat. The cellular configurations may include functionalities (e.g., with one or more settings) used to configure the component (e.g., transceiver 30, cellular modem) and/or the electronic device 10. For example, the cellular configuration may configure the electronic device 10 to operate using a carrier aggregation configuration (e.g., with a number of component carriers), a dual connectivity configuration, an uplink configuration (e.g., transmitting an amount of data, with a number of receiving paths), a downlink configuration (e.g., transmitting an amount of data, with a number of transmission paths), or any combination thereof. For example, the electronic device 10 may communicate the base station 104 using both 5G/NR coverage and 4G/LTE coverage. In the dual connectivity configuration, the electronic device 10 transmit and/or receive wireless signals to and from the base station 104 using a primary cell group and/or a secondary cell group. The electronic device 10 may consume more power when operating with both the primary cell group and the secondary cell group in comparison to limiting operation to the primary cell group. In another example, the electronic device 10 may communicate with the base station 104 on one or more frequency bands in Frequency Range 1 (e.g., sub-6 GHz frequency bands, from 410 MHz to 7125 MHz) as defined by the 3GPP, Frequency Range 2 (e.g., 24.25 GHz to 71.0 GHz) as defined by the 3GPP, or the like. The electronic device 10 may transmit and/or receive wireless signals on one of the frequency bands using one or more component carriers (e.g., frequency ranges or blocks). In certain instances, operating with a higher number of component carriers increase flexibility to utilize an available aggregated channel bandwidth for communications but may consume more power in comparison to operating with a fewer number of component carriers. Still in another example, the electronic device 10 may transmit and/or receive signals via multiple transmission paths (e.g., transmitter 52 and antenna 55) and/or receiving paths (e.g., receiver 54 and antenna 55), respectively. The electronic device 10 may include multiple transmission paths and/or receiving paths for transmitting and/or receiving wireless signals to and from the base station 104. Indeed, the electronic device 10 may consume more power operating with a higher number of transmission paths and/or receiving paths in comparison to operating with a smaller number of transmission paths and/or receiving paths.

Additionally, components of the electronic device 10 may adjust a functionality of the component (e.g., transceiver 30, cellular modem) based on the cellular configuration, which may increase or decrease power consumption and/or thermal generation of the component. For example, operations in a cellular configuration using more component carriers may cause the transceiver 30 to consume more power and/or the antenna 55 to generate more heat in comparison to a cellular configuration with fewer component carriers. In another example, operations in a cellular configuration using more transmission paths and/or or receiver paths may cause the transceiver 30 to consume more power and/or the transmitter 52, receiver 54, and/or the antenna 55 to generate more heat in comparison to a cellular configuration using fewer transmission paths and/or receiver paths. In certain instances, the component may receive a first control signal to operate in first cellular configuration that causes the component to consume more power and/or generate more heat than allocated to the component. The component may receive a second control signal to operate in a second cellular configuration that causes the component to consume less power and/or generate less heat by reducing functionality of the component.

Figure 4:
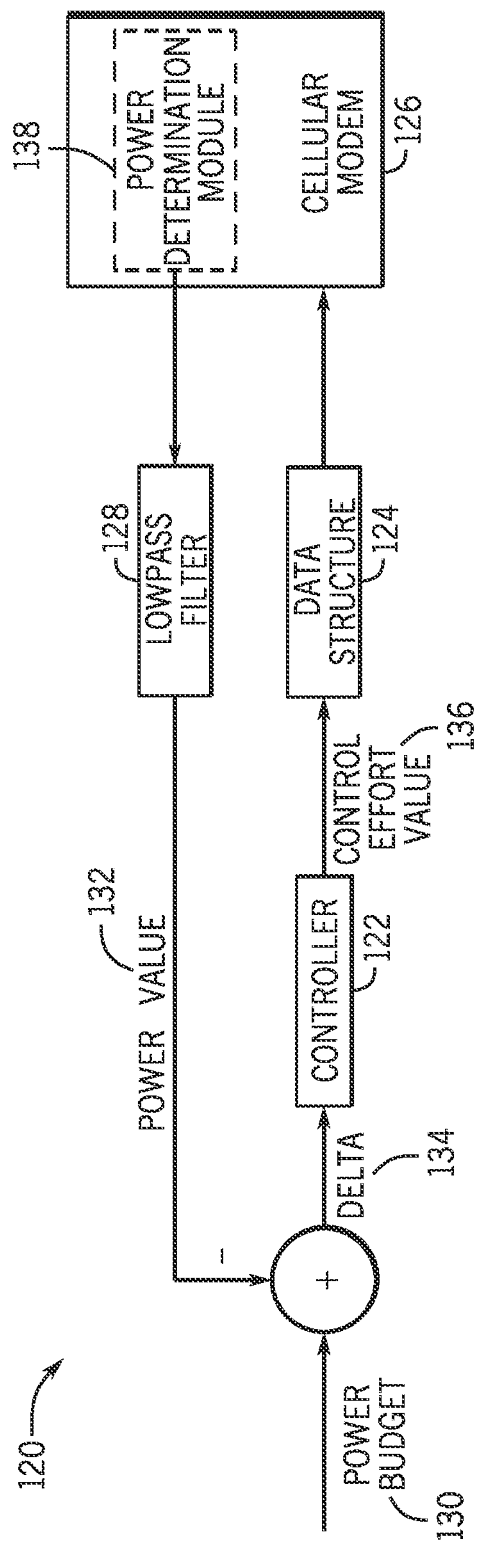
FIG. 4 is a schematic diagram of a mitigation logic of the electronic device of FIG. 1 including a controller and a data structure, according to embodiments of the present disclosure.

With the foregoing in mind, FIG. 4 is a schematic diagram of mitigation logic 120 of the electronic device 10 including a controller 122 and a data structure 124, according to embodiments of the present disclosure. The mitigation logic 120 may receive a power budget 130 from a power controller (e.g., processor 12, power management integrated circuit (PMIC)) and a power value 132 from a cellular modem 126 within the electronic device 10. The power budget 130 may include an amount of power allocated to the cellular modem 126. In certain instances, decreasing the power budget 130 may decrease a functionality of the cellular modem 126, while increasing the power budget 130 may increase a functionality of the cellular modem 126. The power value 132 may include a power consumption of the cellular modem 126, such as a measurement or an estimate of the power being used by the cellular modem 126. For example, the controller 122 may receive an indication of the power value 132 from operating characteristic determination logic 56 that may be coupled to and/or within the cellular modem 126. The operating characteristic determination logic 56 may measure or estimate the power consumption of the cellular modem 126. Based on the power budget 130 and the power value 132, the mitigation logic 120 may determine a cellular configuration for the cellular modem 126, which may cause the power consumption of the cellular modem 126 to be adjusted (e.g., increased, decreased). The mitigation logic 120 may be implemented by the processor 12, software stored in the memory 14, firmware, logic, or any suitable component within the electronic device 10.

In an embodiment, the power budget 130 and the power value 132 may include or be replaced by other values relating to other operating characteristics of the electronic device 10, such as temperature and/or thermal energy generation. For example, the mitigation logic 120 may receive a temperature threshold from a temperature controller (e.g., processor 12) and a temperature value from the operating characteristic determination logic 56. That is, the power budget 130 may also include or replaced by the temperature threshold, which may be a maximum temperature set for the cellular modem 126, a component within the electronic device 10, the electronic device 10, or any combination thereof. Additionally, the power value 132 may also include or be replaced by an amount of heat generated by the cellular modem 126, a component within the electronic device 10, the electronic device 10, or any combination thereof. For example, the cellular modem 126 may generate heat during operation and the operating characteristic determination logic 56 may determine an amount of heat generated (e.g., a temperature value). In another example, the component may include the transmitter 52, the receiver 54, the antennas 55, and the like, which may generate heat during operation. In certain instances, adjusting functionality of the cellular modem 126 may change the amount of heat generated by the component.

The mitigation logic 120 may include the controller 122 that receives the power budget 130 and the power value 132 and determines a control effort value (e.g., a value corresponding to a cellular configuration). The controller 122 may include a control function, such as a control loop mechanism using feedback, a closed feedback loop, a proportional-integral (PI) controller, a proportional-integral-derivative (PID) controller, and so on. The controller 122 may receive a set point (e.g., power budget 130) and a process variable (e.g., power value 132), and determine an error value (e.g., the delta value 134) as the difference between the set point and the process variable. For example, the controller 122 may receive the power budget 130 from a power controller (e.g., the processor 12) of the electronic device 10 and the power value 132 from the cellular modem 126. The cellular modem 126 may include a power determination module 138 that determines (e.g., measures, estimates) power consumption of the cellular modem 126 during operation in the cellular configuration. To this end, the power determination module 138 may include the operating characteristic determination logic 56 described with respect to FIG. 2.

In an embodiment, the mitigation logic 120 may include multiple controllers 122 that may concurrently operate. For example, a first controller 122A may receive the power budget 130 and the power value 132 and a second controller 122B may receive a temperature threshold and a temperature of the cellular modem 126. The first controller 122A may determine a first control effort value based on the power budget 130 and the power value 132 while the second controller 122B may determine a second control effort value based on the temperature threshold and the temperature. In certain instances, the control effort value (e.g., between the first control effort value and the second first control effort value) corresponding to a greater decrease in cellular function may be implemented.

The controller 122 may determine a delta value 134 by determining a difference between the power budget 130 and the power value 132. For example, the controller 122 may subtract the power value 132 from the power budget 130 to determine if the power value 132 may be greater than, equal to, or less than the power budget 130. If the power value 132 is less than the power budget 130, then the cellular modem 126 may use more power and/or generate more thermal energy during the operations. That is, the cellular modem 126 may operate in a cellular configuration that increases functionality, thus increasing power consumption. If the power value 132 is equal to the power budget 130, then the cellular modem 126 may continue operation in its current cellular configuration. If the power value 132 is greater than the power budget 130, then the cellular modem 126 may operate in a different cellular configuration using less power and/or generate less thermal energy during the operations. The controller 122 may continuously operate in a loop (e.g., feedback loop) adjusting the cellular configuration to cause the power value 132 to be at the power budget 130.

The controller 122 may determine the control effort value 136 based on the delta value 134. For example, the control effort value 136 may include a value between zero and one. In another example, the control effort value 136 may include any suitable value, such as a number between zero and one hundred, a number between zero and one thousand, a number between one hundred and two hundred, and so on. In some embodiments, the control effort value 136 may be associated with a cellular configuration stored in the data structure 124.

For example, the data structure 124 may include a relationship between one or more control effort values 136 and one or more cellular configurations. In an embodiment, the data structure 124 may include a function (e.g., transfer function) that describes the relationship. As described above, the cellular configuration may include functionalities for configuring the cellular modem 126. Each control effort value 136 may be associated with a cellular configuration that causes the cellular modem 126 to use an amount of power and/or generate an amount of heat. For example, a lower control effort value 136 may be associated with a cellular configuration that configures the cellular modem 126 consume more power and/or output more heat than a cellular configuration associated with a higher control effort value 136. As further described with respect to FIG. 6, the data structure 124 may include multiple rows of cellular configurations associated with control effort values 136 in a monotonically decreasing order. For example, a first row of the lookup table may include a cellular configuration that configures the cellular modem 126 to use more power and/or generate more heat in comparison to a cellular configuration in each subsequent row of the lookup table. While the illustrated example includes one data structure 124, any suitable number of data structures 124 storing a relationship between one or more control effort values 136 and one or more cellular configurations may be used by the mitigation logic 120.

The electronic device 10 may generate a control signal indicative of the cellular configuration based on the control effort value 136 and transmit the control signal to the cellular modem 126 for configuration. For example, cellular modem 126 may receive the control signal and adjust operation to conform to the cellular configuration. In certain instances, conforming to the cellular configuration may include reducing the cellular modem's 126 functionality to reduce power consumption and/or heat output. The cellular configuration may include operating using a number of component carriers, a number of transmitting paths and/or or receiving paths, a number of antenna panel elements (e.g., antennas 55), a certain cell carrier, a certain primary cell group, and so on. For example, the control signal may cause the cellular modem 126 to reduce a number of transmission paths from a current configuration, which reduces a functionality of the cellular modem 126, the transmitter 52, and/or the antenna 55. The reduced functionality may cause the cellular modem 126 to consume less power and/or generate less heat during operations. For example, reducing the number of transmission paths may cause one or more transmitters 52 and/or one or more antennas 55 to stop operations, thereby reducing power consumption and/or heat outputted by the cellular modem 126 and/or the electronic device 10. In other instances, the control signal may be indicative of a cellular configuration associated with an increase in the cellular modem's 126 functionality, thereby increasing power consumption and/or heat output. For example, the cellular configuration may increase the electronic device's 10 and/or the cellular modem's 126 functionality, such as by increasing the number of transmission and/or receiving paths, operating using dual cell groups, increasing uplink data transmission, operating using an increased number of component carriers, or the like.

Prior to the controller 122 receiving the power value 132, a low pass filter 128 may adjust (e.g., filter) the power value 132. The low pass filter 128 may filter out signals above a threshold, such as a cut-off frequency. For example, the power value 132 may fluctuate during operation of the electronic device 10 and the low pass filter 128 may pass signals below the cut-off frequency and attenuate signals above the cut-off frequency to facilitate changing cellular configurations. The electronic device 10 may operate in high power when downloading user data over a first period of time, operate in low power when browsing a webpage over a second period of time, and then operate in high power when downloading video data over a third period of time. The periods of time of these different operations may be short, such as 100 milliseconds or less, which may cause the power value 132 to increase or decrease rapidly. The low pass filter 128 may remove noise (e.g., at higher frequencies) from and smooth the signal to improve the delta value 134 determination, the control effort value 136 determination, and/or the cellular configuration determination.

The mitigation logic 120 may include a feedback loop that continuously compares the power value 132 to the power budget 130 to determine the delta value 134, the control effort value 136, and/or the cellular configurations. In this way, the mitigation logic 120 may operate the cellular modem 126 in a cellular configuration that meets or approaches, without exceeding, the power budget 130 and/or the temperature threshold.

Figure 5:
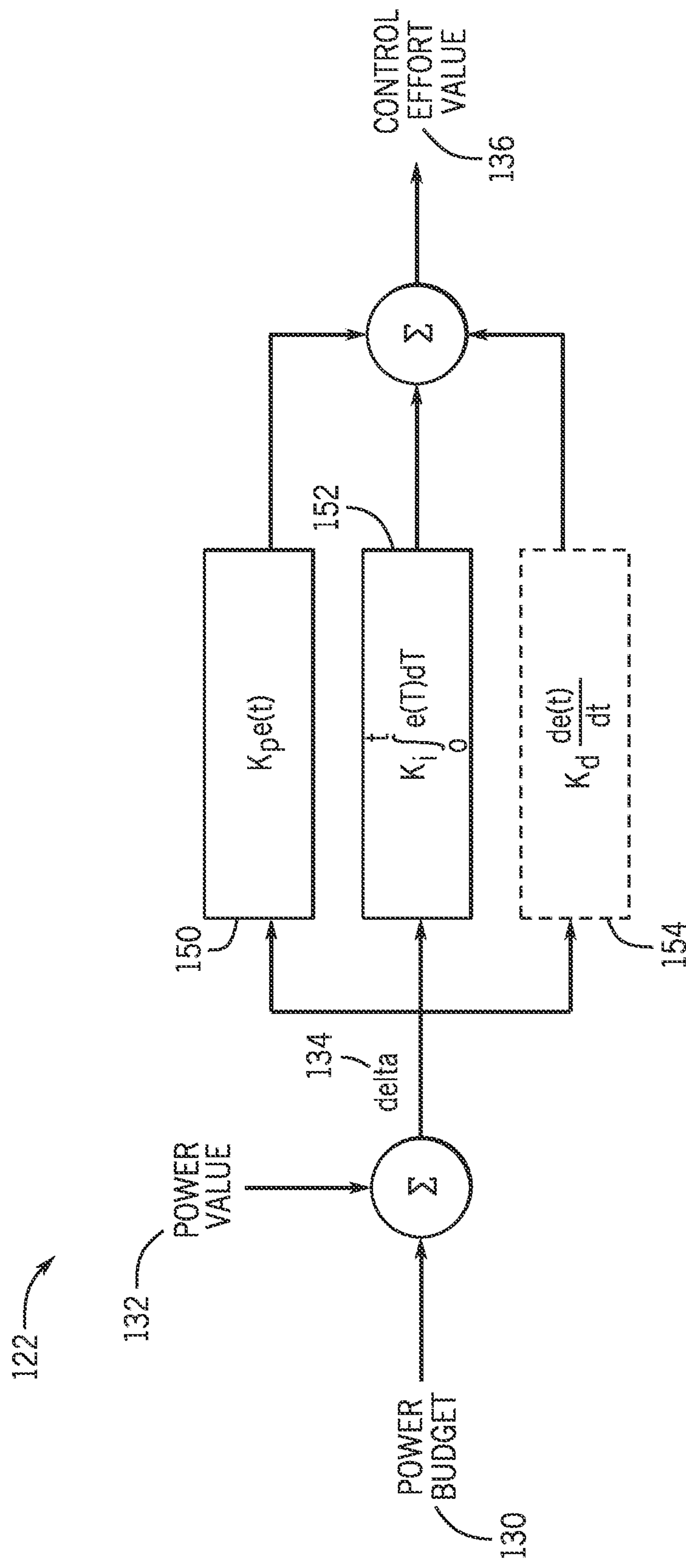
FIG. 5 is a schematic diagram of the controller of the mitigation logic of FIG. 4, according to embodiments of the present disclosure.

FIG. 5 is a schematic diagram of the controller 122 of the mitigation logic 120, according to embodiments of the present disclosure. The controller 122 may include a control loop function that continuously determines an error as a difference between a desired set point and a measured process variable. For example, the controller 122 may receive the power budget 130 and the power value 132 and determine the delta value 134. The delta value 134 may include the error or the difference between the power budget 130 and the power value 132. The controller 122 may use the delta value 134 and a control function to determine the control effort value 136. In certain instances, the controller 122 may increase control output correction based on an increasing positive result or apply a negative control output correction based on an increasing positive result. For example, controller 122 may apply a negative corrective action indicating that the control output action is reversed.

In an embodiment, the controller 122 may include a proportional-integral (PI) controller that determines the control effort value 136 based on a proportional value 150 and an integral value 152. For example, the controller 122 may operate using a control function described in Equation 1, below.

$$K_p e(t) + K_i \int_0^t e(T)dT = \text{Control Effort Value 136} \quad \text{(Equation 1)}$$

The proportional value 150 may include a current value of the error between the desired set point and the measured process variable. The proportional value 150 may be expressed as $K_p e(t)$. For example, the proportional value 150 may include the delta value 134. If the delta value 134 is large, the outputted control effort value 136 may be proportionally large by a gain factor $K_p$. Using the proportional value 150 alone may result in an error because the controller 122 uses an error to generate the proportional output value. The integral value 152 may account for past values of the error and integrate the past values over time. For example, the integral value 152 may reduce residual error (e.g., error after the application of the proportional value 150) by adding a control effort value (e.g., 136) based on a historic cumulative value of the error over time. The integral value 152 may be expressed as $$K_i \int_0^t e(T)dT.$$

When error is eliminated, the integral value 152 may stop growing and/or changing. As such, the proportional value 150 and/or the proportional effect may decrease as the error decreases. The control effort value 136 may be continuously generated and/or adjusted in this manner to cause the power value 132 to be closer and/or within the power budget 130. The control effort value 136 may be associated with a cellular configuration used to configure the cellular modem 126. As such, the controller 122 may cause the power consumption of the cellular modem 126 to match the power budget 130 with minimal delay and/or overshoot by adjusting the control effort value 136 in a controller manner (e.g., based on Equation 1).

Balance between the proportional value 150 and the integral value 152 may be improved based on loop tuning (e.g., feedback loop) and one or more tuning constants. For example, a tuning constant, K, may be determined for each control function (e.g., control application). The tuning constant may be dependent on a behavior of a sensor (e.g., operating characteristic determination logic 56), a control element (e.g., cellular modem 126, components within the electronic device 10), control signal delays, the control function (e.g., of the controller 122), and the like. In certain instances, the tuning constant K may be tuned (e.g., refined) by adjusting the control function with a setpoint change and observing a response (e.g., power value 132).

With the foregoing in mind, the controller 122 may use the delta value 134, the proportional value 150, and the integral value 152 to determine the control effort value 136. For example, the controller 122 may store an indication of the delta value 134 in the memory 14 and/or the storage 16 over a time period. The time period may be any suitable amount of time such as 100 milliseconds, 100 seconds, 100 minutes, and so on. In an instance, the controller 122 may determine the proportional value 150 based on the delta value 134 and determine the control effort value 136 based on the proportional value 150. The controller 122 may determine the integral value 152 based on the stored delta values 134 in and adjust the control effort value 136 based on the integral value 152. In another instance, the controller 122 may sum the proportional value 150 and the integral value 152 to determine the control effort value 136. Accordingly, the control effort value 136 enables operating characteristics (e.g., power consumption, thermal energy generation) of the cellular modem 126 operating using a subsequent cellular configuration to be within the power budget 130 and/or closer to the power budget 130 in comparison to operating characteristics of a prior cellular configuration.

In another embodiment, the controller 122 may include a proportional-integral-derivative (PID) controller determines the control effort value 136 based on the proportional value 150, the integral value 152, and a derivative value 154. For example, the controller 122 may operate using the function described in Equation 2, below.

$$K_p e(t) + K_i \int_0^t e(T)dT + K_d \frac{de(t)}{dt} = \text{Control Effort Value 136} \quad \text{(Equation 2)}$$

As discussed with respect to Equation 1, the proportional value 150 may be expressed as $K_p e(t)$ and the integral value 152 may be expressed as $$K_i \int_0^t e(T)dT.$$

The derivative value 154 may be a current rate of change of the error. The derivative value 154 may be expressed as $$K_d \frac{de(t)}{dt}$$

and may estimate a future trend of the error and may reduce the error by exerting a control influence based on the rate of change. For example, a greater rate of change may cause a greater controlling or dampening effect (e.g., via the control effort value 136). The control effort value 136 may be continuously generated and/or adjusted based on the proportional value 150, the integral value 152, and the derivative value 154. For example, the controller 122 may determine each value based on the delta value 134 and/or one or more past delta values (e.g., stored in the memory 14 or the storage 16). The controller 122 may sum the proportional value 150, the integral value 152, and the derivative value 154 to determine the control effort value 136. The control effort value 136 may be associated with a subsequent cellular configuration that configures the cellular modem 126 such that the operating characteristics may be at or closer to set operating characteristics (e.g., power budget 130, temperature threshold). FIG. 6 is an example table of a data structure 124 of the mitigation logic 120, according to embodiments of the present disclosure. The data structure 124 may represent a relationship between one or more control effort values 136 and one or more cellular configurations 192. For example, the control effort value 136 determined by the controller 122 may be mapped to a respective cellular configuration 192 stored in the data structure 124.

By way of example, the data structure 124 may include a lookup table with multiple columns and rows. A first column may include one or more control effort values 136 and the remaining columns may include one or more functionalities 190 of each cellular configuration 192. The functionalities 190 may include a number of component carriers in carrier aggregation configurations, a primary and/or a secondary cell group in dual connectivity configurations, a number of receiving paths on individual component carriers, an amount of uplink data (e.g., a percentage of uplink data transmission), a number of uplink carrier components in an uplink-carrier aggregation configuration, and the like. Each cellular configuration 192 may include a setting (e.g., value) for each functionality 190 to configure the cellular modem 126 of the electronic device 10, thereby adjusting the power consumption and/or heat output. For example, adjusting an amount of uplink data being transmitted may adjust power consumption and/or heat output of the cellular modem 126. As discussed herein, the cellular configuration 192 may be associated with a control effort value 136. The control effort values 136 may include values between zero and one, however control effort values 136 may be any suitable value. The rows may monotonically decrease such that each subsequent row includes a cellular configuration 192 that causes the component operate using less power and/or generate less heat. That is, each subsequent row included a decrease in one or more functionalities 190 of the cellular modem 126.

By way of illustrative example, the data structure 124 may include cellular configurations 192 for configuring the electronic device 10 operating using E-UTRAN New Radio-Dual Connectivity (ENDC) or using both LTE and 5G simultaneously or concurrently on one frequency band (e.g., Band 41 on the 2.5 gigahertz frequency band). The cellular configuration 192 may include a setting for each the functionality 190. For example, a first functionality 190A may include operating with a number of component carriers in LTE, a second functionality 190B may include operating with a number of component carriers in four receiving paths, a third functionality 190C may include operating with a number of component carriers on NR FR2, and a fourth functionality 190D may include operating with a number of operating elements in a millimeterWave (mmWave) antenna panel in the FR2 configuration. Although the data structure 124 includes cellular configurations 192 with four functionalities 190, the cellular configurations 192 include any suitable number of actions, such as 1, 2, 3, 5, 6, 7, 8, or more actions. Moreover, the illustrated example includes one data structure 124, however any suitable number of data structures 124, such as 2 or more, 4 or more, 6 or more, 8 or more, 10 or more, 20 or more, 40 or more, and so on may be used to determine the cellular configuration. For example, respective data structures 124 may be generated for each RAT configuration, such as a respective data structure 124 for an LTE configuration, an ENDC (e.g., an LTE+NR FR1, LTE+NR FR2) configuration, a standalone (SA) configuration, a non-standalone configuration, a standalone dual connectivity (SADC) (e.g., NR FR1+NR FR2) configuration, and so on.

For example, a first row of the data structure 124 may include a control effort value 136 of zero, which may be associated with a first cellular configuration 192A. The first cellular configuration 192A may include operating with four component carriers in the LTE configuration, using four receiving paths, using eight NR FR2 component carriers, and the using five operating elements on the antenna panel. Moving to a second row of the data structure 124, the control effort value 136 may be 0.2 and may be associated with a second cellular configuration 192B. The second cellular configuration 192B may include which may operating with one component carrier in the LTE configuration, operating with zero receiving paths, operating with eight NR FR2 component carriers, and operating with five operating elements on the antenna panel. The second cellular configuration 192B may include operating with fewer active components in comparison to the first cellular configuration 192A, may reduce power consumption of the cellular modem 126. For example, the second cellular configuration 192B may cause the cellular modem 126 to operate using fewer component carriers and fewer receiving paths in LTE in comparison to the first cellular configuration 192A of the cellular modem 126. That is, the data structure 124 may be organized such that operation on 5G-NR may be preferred over operations on LTE. In this way, operating in the second cellular configuration 192B may improve performance of the electronic device 10 while also maintaining operations within the power budget 130. As such, the electronic device 10 may consume less power when operating in the second cellular configuration 192B in comparison to operation in the first cellular configuration 192A.

In another example, a last row may include a control effort value 136 of one, which may be associated with a third cellular configuration 192C. The third cellular configuration 192C may include operating with one component carrier in the LTE configuration, operating with zero receiving paths, operating with one NR F2 component carrier, and operating with one operating element on the antenna panel. In comparison to the first cellular configuration 192A and/or the second cellular configuration 192B, the third cellular configuration 192C uses a fewest number of component carriers and/or receiving paths in LTE, a fewest number of component carriers and NR FR, and a fewest number of panel elements. Reducing a number of active components may reduce power consumption of the cellular modem 126 when operating in the third cellular configuration 192C. By associating the control effort value 136 with the cellular configuration 192, the data structure 124 may be dynamically applied to varying throughput conditions. Indeed, throughput of the electronic device 10 and/or the cellular modem 126 may factored into power value 132. The described cellular configurations 192 are merely illustrative, and the cellular configuration 192 may include any suitable combination of functionalities, settings, and the like to adjust the operating characteristics of the cellular modem 126 to a target level (e.g., the power budget 130). Moreover, the cellular configurations 192 may include more or less functionalities 190 than described. For example, the cellular configurations 192 may include additional radio access technologies (RAT), such as 3G, 4G, 5G, 6G, a satellite network, non-terrestrial network, and so on.

FIG. 7 is another example table of the data structure 124 of the mitigation logic 120, according to embodiments of the present disclosure. The data structure 124 of FIG. 7 may include additional rows and columns compared to that of FIG. 6 that correspond to additional functionalities 190 and cellular configurations 192. For example, the data structure 124 may include fifty rows that each correspond to a cellular configuration 192 and a control effort value 136. As illustrated, the rows may be organized such that power consumption monotonically decreases from a first row to a last row of the data structure 124. That is, the cellular configurations 192 may be organized such that power consumption decreases as control effort value 136 increases. In other embodiments, the cellular configurations 192 may increase in power consumption as control effort value 136 increases. The data structure 124 also includes five columns that each correspond to a functionality 190 of the cellular configuration 192. For example, a first functionality 190A may include operating with a number of component carriers in LTE, a second functionality 190B may include operating with a number of component carriers in four receiving paths, a third functionality 190C may include operating with a number of component carriers on NR FR2, a fourth functionality 190D may include operating with a number of operating elements in a mmWave antenna panel in the FR2 configuration, and a fifth functionality 196E may include an amount (e.g., a percentage) of uplink data being transmitted. In certain instances, adjusting throughput of uplink data transmission may cause a smaller power consumption change in comparison to a power consumption change caused by other functionalities 190, such as the first functionality 190A, the second functionality 190B, and so on. As such, the data structure 124 may include multiple cellular configurations 192 for configurating the electronic device 10, which may improve performance of the electronic device and also cause operations to be within the power budget 130.

Figure 8:
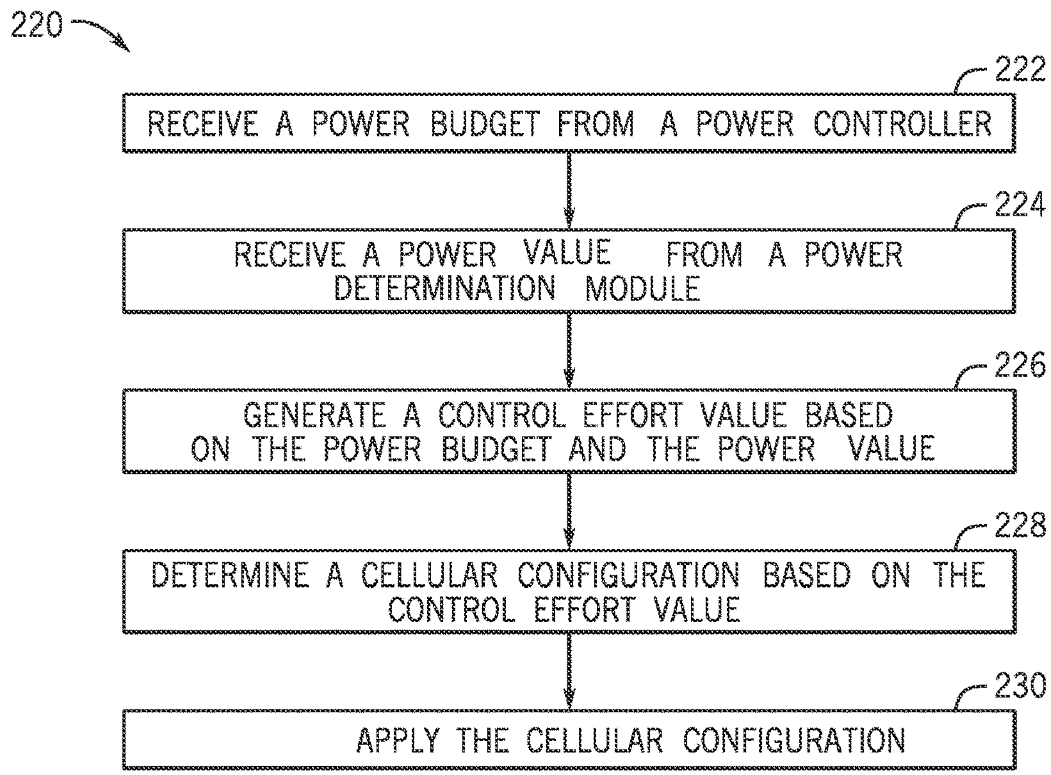
FIG. 8 is a flowchart of a method for operating a cellular modem of the electronic device of FIG. 1 based on a power budget from a power controller and a power value from the cellular modem, according to embodiments of the present disclosure.

FIG. 8 is a flowchart of a method 220 for operating the cellular modem 126 of the electronic device 10 based on a power budget 130 from a power controller and a power value 132 from the cellular modem 126, according to embodiments of the present disclosure. Any suitable device (e.g., a controller) that may control components of the electronic device 10, such as the processor 12, may perform the method 220. In some embodiments, the method 220 may be implemented by executing instructions stored in a tangible, non-transitory, computer-readable medium, such as the memory 14 or storage 16, using the processor 12. For example, the method 220 may be performed at least in part by one or more software components, such as an operating system of the electronic device 10, one or more software applications of the electronic device 10, and the like. While the method 220 is described using steps in a specific sequence, it should be understood that the present disclosure contemplates that the described steps may be performed in different sequences than the sequence illustrated, and certain described steps may be skipped or not performed altogether.

In process block 222, the processor 12 receives a power budget 130 from a power controller. For example, the processor 12 may receive an indication of the power budget 130 from the power source 29, the memory 14, and/or the storage 16. The indication may include an amount of power allocated (e.g., power budget) to the cellular modem 126 over a period of time and/or for operations. For example, external factors, such as cold weather, may reduce an amount of power within the power source 29 and may cause the electronic device 10 to operate in a low power mode (e.g., in a configuration with reduced power) for the period of time. In an embodiment, the cellular modem 126 may generate heat during the operations and the processor 12 may receive an indication to decrease an amount of heat generated by the cellular modem 126.

In process block 224, the processor 12 receives a power value 132 from a power determination module 138. The cellular modem 126 may include the power determination module 138 that determines an operating characteristic of the cellular modem 126 during operations. The power determination module 138 may determine the power consumption and/or the thermal energy generation of the cellular modem 126 and transmit an indication of the operating characteristics to the processor. For example, the power determination module 138 may transmit a power value 132 to the processor 12.

In process block 226, the processor 12 generates a control effort value 136 based on the power budget 130 and the power value 132. For example, the controller 122 may determine the delta value 134 by taking difference between the power value 132 and the power budget 130. As described with respect to FIGS. 4 and 5, the controller 122 may then use the delta value 134 to determine a proportional value 150, an integral value 152, a derivative value 154, or any combination thereof to determine the control effort value 136.

In process block 228, the processor 12 determines a cellular configuration 192 based on the control effort value 136. For example, the data structure 124 may store a relationship between one or more control effort values 136 and one or more cellular configurations 192. The processor 12 may use the data structure 124 to determine a cellular configuration 192 associated with the control effort value 136. For example, the processor 12 may determine one or more settings for the functionalities of the cellular configuration 192.

In process block 230, the processor 12 applies the cellular configuration 192. For example, the processor 12 may transmit a control signal (e.g., an indication) of the cellular configuration 192 to the cellular modem 126 to cause the cellular modem 126 to adjust operation. The cellular modem 126 may operate using the cellular configuration 192, which may reduce power consumption and/or reduce functionality. For example, the cellular modem 126 may operate with fewer component carriers, drop a secondary cell group, reduce a number of transmitting or receiving paths, and so on. In this manner, the mitigation logic 120 and/or the method 220 may improve power efficiency of the electronic device 10 and/or improve a functionality of the power source 29.

In certain instances, the power budget 130 may be greater than the power value 132 and the control signal may be indicative of cellular configuration 192 using higher power consumption. The cellular modem 126 may transition operation to the cellular configuration 192 by operating with more component carriers, use a secondary cell group, increase a number of transmitting or receiving paths, increase uplink data, and so on. In this way, the cellular modem functionality and power consumption may be increased, which may increase operating efficiency (as more power may be consumed or heat generated while operating within the power budget or temperature threshold). The method 220 may then return to process block 222 to receive the power budget 130, then process block 224 to receive the power value 132, process block 226 to generate the control effort value 136, and process block 228 to determine the cellular configuration 192.

Embodiments discussed herein may be applied to additional components (e.g., transmitter 52, receiver 54, antenna 55) within the electronic device 10 that generate thermal energy during operations, such as transmitting and receiving wireless signals. For example, the components may be communicatively coupled to the cellular modem 126 and configuring the cellular modem 126 based on a cellular configuration 192 may cause the components to generate more or less heat. In certain instances, operating at certain (e.g., high) temperatures may reduce a lifetime of the components within the electronic device 10, age the components, and/or decrease an amount of power deliverable by the power source 29. To reduce the thermal energy generation during operations, the processor 12 may determine a temperature of the components within the electronic device 10, compare the temperature to a temperature threshold, and adjust a cellular configuration 192 of the cellular modem 126 such that the temperature of the component may be equal to or less than the temperature threshold.

Figure 9:
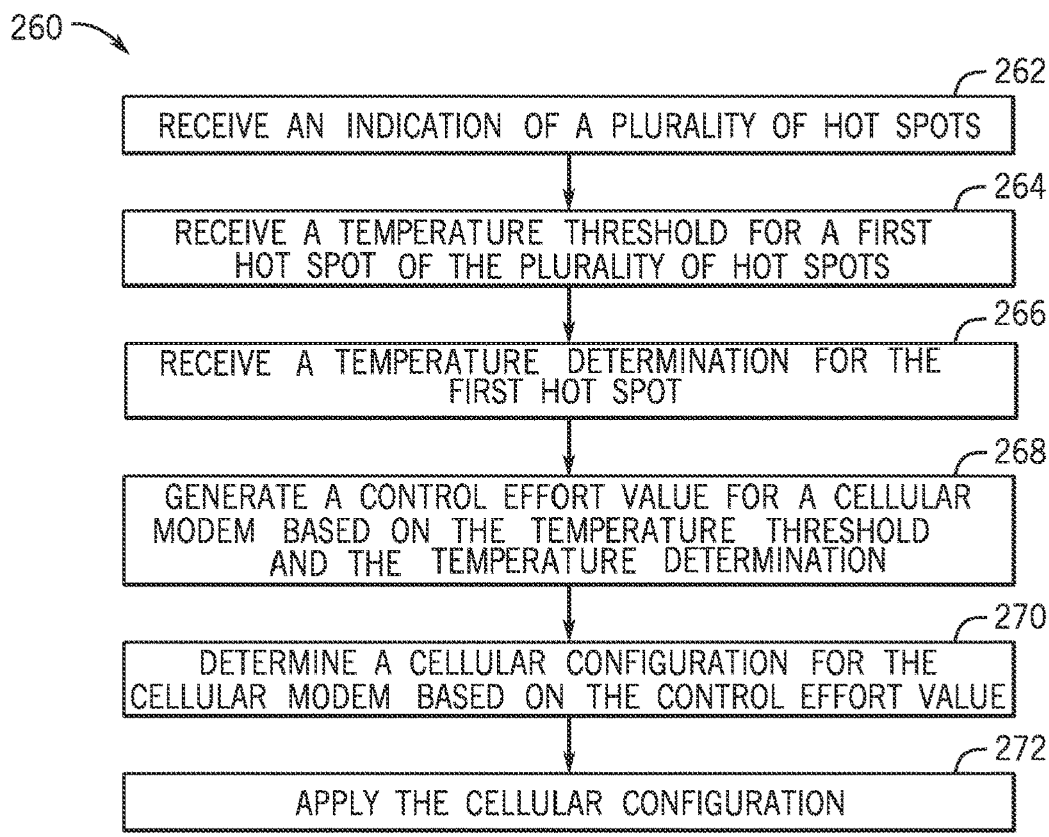
FIG. 9 is a flowchart of a method for configuring the cellular modem of the electronic device of FIG. 1 based on operating characteristics of a component within the electronic device of FIG. 1, according to embodiments of the present disclosure.

With the foregoing in mind, FIG. 9 is a flowchart of a method 260 for configurating the cellular modem 126 of the electronic device 10 based on operating characteristics of a component within the electronic device 10, according to embodiments of the present disclosure. The operating characteristics may include thermal energy generation. To this end, the power budget 130 may include a temperature threshold and the power value 132 may include a temperature determination (e.g., temperature value) of the component. Any suitable device (e.g., a controller) that may control components of the electronic device 10, such as the processor 12, may perform the method 260. In some embodiments, the method 260 may be implemented by executing instructions stored in a tangible, non-transitory, computer-readable medium, such as the memory 14 or storage 16, using the processor 12. For example, the method 220 may be performed at least in part by one or more software components, such as an operating system of the electronic device 10, one or more software applications of the electronic device 10, and the like. While the method 260 is described using steps in a specific sequence, it should be understood that the present disclosure contemplates that the described steps may be performed in different sequences than the sequence illustrated, and certain described steps may be skipped or not performed altogether.

In process block 262, the processor 12 receives an indication of one or more hot spots. The hot spots may include components or regions within the electronic device 10 that generate heat during operations. For example, the cellular modem 126 may be configured to operate in a cellular configuration 192 that causes heat generation. Operating in the cellular configuration 192 may also cause one or more additional components to generate heat. The additional components may be any suitable component within the electronic device 10, such as the memory 14, the storage 16, and the I/O interface 24, the transmitter 52, the receiver 54, the antennas 55, one or more connections (e.g., circuit junctions), and so on. In certain instances, a location of the components may be stored in a database (e.g., memory 14) and may be labelled as a "hot spot". As such, the processor 12 may receive an indication of a component and/or a region within the electronic device 10 that may be generating the heat.

In process block 264, the processor 12 receives a temperature threshold for a first hot spot of the plurality of hot spots. For example, the processor 12 may receive temperature threshold for the first hot spot from a temperature controller, the memory 14, the storage 16, and the like. In another example, the processor 12 may receive a temperature threshold for the cellular modem 126 and/or the electronic device 10. In certain instances, the processor 12 may receive an amount of power allocated (e.g., the power budget 130) to the first hot spot, which may correspond to adjusting the thermal energy generation of the first hot spot.

In process block 266, the processor 12 receives a temperature determination for the first hot spot. For example, the first hot spot may be coupled to and/or include the operating characteristic determination logic 56 that determines a temperature of the first hot spot. In another example, the processor 12 may receive a temperature determination of the cellular modem 126 from the operating characteristic determination logic 56. In certain instances, the processor 12 may receive a power value 132 of the first hot spot.

In process block 268, the processor 12 generates a control effort value 136 for a cellular modem based on operating characteristics of the first hot spot. For example, the processor 12 may determine the control effort value 136 based on the temperature threshold and the temperature determination of the first hot spot. In another example, the processor 12 may determine the control effort value 136 based on the temperature threshold and the temperature determination of the cellular modem 126. To this end, the controller 122 may determine the delta value 134 based on the power budget 130 and the power value 132. In an embodiment, the controller 122 may include the PI controller and generate the control effort value 136 based on the delta value 134, the proportional value 150, and the integral value 152. In another embodiment, the controller 122 may include the PID controller and generate the control effort value 136 based on the delta value 134, the proportional value 150, the integral value 152, and the derivative value 154.

In process block 270, the processor 12 determines a cellular configuration 192 for the cellular modem 126, similar to process block 232 described with respect to FIG. 7. For example, the processor 12 may use (e.g., query) the data structure 124 to determine the cellular configuration 192 based on the control effort value 136.

In process block 272, the processor 12 applies the configuration to the cellular modem 126, similar to process block 230 described with respect to FIG. 7. For example, the processor 12 may transmit a control signal indicative of the cellular configuration 192 to the cellular modem 126 to adjust the functionality, which may cause the cellular modem 126, the first hot spot, and/or the electronic device 10 to generate less heat during the operation. In another example, the cellular configuration 192 may increase functionality of the cellular modem 126, the component, and/or the electronic device 10, which may cause more heat to be generated.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A communication device, comprising:

a memory storing a relationship between a plurality of cellular configurations for a cellular modem and a plurality of control effort values, each of the plurality of control effort values associated with a respective operating characteristic of the cellular modem; and processing circuitry coupled to the memory, the processing circuitry configured to:

receive an operating characteristic of the cellular modem operating in a first cellular configuration of the plurality of cellular configurations;

receive a threshold from a power controller;

determine a control effort value based on the operating characteristic, the threshold, and a control function;

determine a second cellular configuration of the plurality of cellular configurations based on the control effort value and the relationship between the plurality of cellular configurations and the plurality of control effort values; and transmit a first control signal indicative of the second cellular configuration to the cellular modem that causes the cellular modem to operate in the second cellular configuration.

2. The communication device of claim 1, wherein the processing circuitry is configured to transmit the first control signal indicative of the second cellular configuration based on the operating characteristic being greater than the threshold, wherein the second cellular configuration causes the cellular modem to reduce the operating characteristic.

3. The communication device of claim 1, wherein the operating characteristic comprises power.

4. The communication device of claim 1, wherein the operating characteristic comprises temperature.

5. The communication device of claim 1, wherein the processing circuitry is configured to:

receive a second operating characteristic of the cellular modem operating in the second cellular configuration, the second operating characteristic being equal to the threshold; and transmit a second control signal indicative of the second cellular configuration to the cellular modem that causes the cellular modem to operate in the second cellular configuration.

6. The communication device of claim 1, wherein the second cellular configuration reduces the operating characteristic of the cellular modem, a functionality of the cellular modem, or both.

7. The communication device of claim 6, wherein the second cellular configuration reduces the functionality of the cellular modem by reducing a number of component carriers in a carrier configuration, removing a secondary cell group in a dual connectivity configuration, reducing a receiver path on a component carrier, reducing a number of operating elements in an antenna panel, reducing uplink data, reducing a number of uplink component carriers, or any combination thereof.

8. The communication device of claim 1, wherein each of the plurality of cellular configurations comprise operating with a number of component carriers in a carrier configuration, a cell group in a dual connectivity configuration, a number of receiver paths on a component carrier, a number of operating elements in an antenna panel, a number of uplink component carriers, or any combination thereof.

9. The communication device of claim 1, wherein the control function comprises a proportional-integral (PI) controller, the PI controller configured to:

determine a delta value based on the operating characteristic and the threshold;

determine a proportional value based on the delta value;

determine an integral value based on one or more past delta values, the one or more past delta values comprising the delta value; and generate the control effort value based on the proportional value and the integral value.

10. The communication device of claim 1, wherein the processing circuitry is configured to receive the operating characteristic from power determination logic coupled to the cellular modem.

11. A non-transitory computer-readable medium, comprising instructions that, when executed by one or more processors, are configured to cause the one or more processors to:

receive a power determination of a cellular modem operating in a first cellular configuration of a plurality of cellular configurations;

receive a power budget from a power controller;

determine a control effort value based on the power determination, the power budget, and a proportional-integral (PI) controller;

determine a second cellular configuration of the plurality of cellular configurations based on the control effort value and a relationship between the plurality of cellular configurations and a plurality of control effort values; and transmit a control signal indicative of the second cellular configuration to the cellular modem that causes the cellular modem to operate in the second cellular configuration.

12. The non-transitory computer-readable medium of claim 11, wherein the instructions, when executed by the one or more processors, are configured to cause the one or more processors to:

receive an additional power determination of the cellular modem operating in the second cellular configuration, the power determination not being equal than the power budget;

determine a second control effort value based on the additional power determination, the power budget, and the PI controller;

determine a third cellular configuration of the plurality of cellular configurations based on the second control effort value and the relationship; and transmit an additional control signal indicative of the third cellular configuration to the cellular modem that causes the cellular modem to operate in the third cellular configuration, the third cellular configuration causes the cellular modem to increase power consumption.

13. The non-transitory computer-readable medium of claim 11, wherein the instructions that are configured to cause the one or more processors to determine the control effort value based on the power determination, the power budget, and the PI controller comprise:

determining, via the PI controller, a proportional value based on a difference between the power budget and the power determination;

determining, via the PI controller, an integral value based on one or more past proportional values, the one or more past proportional values comprises the proportional value; and generating, via the PI controller, the control effort value based on the proportional value and the integral value.

14. The non-transitory computer-readable medium of claim 11, wherein each of the plurality of cellular configurations comprises operating using a number of component carriers in a carrier configuration, a cell group in a dual connectivity configuration, a number of receiver paths on a component carrier, a number of operating elements in an antenna panel, a number of uplink component carriers, or any combination thereof.

15. The non-transitory computer-readable medium of claim 11, wherein the relationship between the plurality of cellular configurations and the plurality of control effort values is stored in a data structure.

16. A method, comprising:

receiving, at processing circuitry of a communication device, power consumption from a cellular modem operating in a first cellular configuration of a plurality of cellular configurations;

receiving, at the processing circuitry, a power budget from a power controller;

determining, via the processing circuitry, a control effort value based on the power consumption, the power budget, and a control function;

determining, via the processing circuitry, a second cellular configuration of the plurality of cellular configurations based on the control effort value and a relationship between the plurality of cellular configurations and a plurality of control effort values; and transmitting, via the processing circuitry, a control signal indicative of the second cellular configuration to the cellular modem that causes the cellular modem to operate in the second cellular configuration.

17. The method of claim 16, wherein operating in the second cellular configuration causes the cellular modem to reduce a number of component carriers in a carrier configuration, remove a secondary cell group in a dual connectivity configuration, reduce a receiver path on a component carrier, reduce a number of operating elements in an antenna panel, reduce an amount of uplink data, reduce a number of uplink component carriers, or any combination thereof.

18. The method of claim 16, wherein the second cellular configuration comprises operating using a pre-determined number of component carriers, a first cell group of a plurality of cell groups in a dual connectivity configuration, a pre-determined number of receiver paths, a pre-determined number of operation elements in an antenna panel, or any combination thereof.

19. The method of claim 16, wherein, determining, via the processing circuitry, the control effort value comprises:

determining, via the control function, a delta value based on the power consumption and the power budget;

determining, via the control function, an integral value based on one or more past delta values, the one or more past delta values comprises the delta value; and determining, via the control function, the control effort value based on the delta value and the integral value.

20. The method of claim 16, wherein the relationship associates each of the plurality of control effort values with a respective power consumption of the cellular modem.

* * * * *